United States Patent Office 3,505,109

Patented Apr. 7, 1970

3,505,109

PRODUCTION OF MAGNETIC RECORDING MEDIA

Georg Schnell, Job-Werner Hartmann, Manfred Steuerwald, and Wolfram Kittler, Ludwigshafen (Rhine), Germany, assignors to Badische Anilin- & Soda-Fabrik Aktiengesellschaft, Ludwigshafen (Rhine), Germany No Drawing. Filed Sept. 27, 1966, Ser. No. 582,241
Claims priority, application Germany, Sept. 29, 1965, 1,285,003
Int. Cl. G03g *19/00;* H01f *1/34*
U.S. Cl. 117—237 8 Claims

ABSTRACT OF THE DISCLOSURE

This invention relates to a method of producing a magnetic recording media by applying to a backing a layer of a dispersion of a ferromagnetic powder, a polyamide binder having an amorphous fraction, a solvent, and a soluble condensation product of an aliphatic fatty acid having 4–22 carbon atoms and an aliphatic hydroxyamine having at least one primary or secondary amino group, at least one hydroxyl group and a molecular weight at less than 500. The coated article is then heated to a temperature higher than the softening temperature of the polyamide amorphous fraction.

This invention relates to a method for the production of magnetic recording media consisting of one or more magnetizable layers of powdered magnetizable substances and binders for recording images, impulses and sound.

It is known that magnetic recording media may be prepared by coating a backing, for example a sheet, film or wire of plastic or metal, with a dispersion of a magnetizable substance in which soluble film-forming macromolecular substances, such as cellulose ethers, cellulose esters, polyvinyl chloride, polyesters, polyurethanes, polyvinylidene chloride, polyvinyl acetate, polybutadiene, polyacrylonitrile, polystyrene or polyamides, are used as binders. These binders do not always satisfy technical requirements, such as high abrasion resistance, mechanical and chemical resistance, resistance to high temperatures, compatibility with the magnetizable substance or dimensional stability. Such binders often shrink when the solvent is removed.

It is also known that polymer-forming substances, such as mixtures of polyisocyanates and polyesters or polyethers containing hydroxy groups, can be used as binders. Although these binders yield magnetic recording media with improved mechanical properties, they have the disadvantage of limited processability because crosslinking occurs to a substantial extent in the dispersion of the magnetizable substance and the binder before the dispersion is applied to the backing.

It is an object of this invention to provide magnetic recording mèdia obtained by applying a dispersion of a soluble linear synthetic polyamide and ferromagnetic powder to backings which are particularly suitable for the ferromagnetic recording of images, impulses and sound and which avoid the disadvantages of the prior art recording media. It is a further object to provide magnetic recording media which have a longer life and better running properties in machines in which recording media, such as tapes, are greatly stressed. Another object of the invention is to provide magnetic recording media having very good flexibility and surface smoothness as well as good mechanical properties which are insensitive to fluctuations in temperature and humidity. It is a particular object of this invention to provide a method for preparing an improved magnetic recording media exhibiting the foregoing advantages.

We have found that these objects are achieved and magnetic recording media having improved properties are obtained by applying a dispersion containing a ferromagnetic powder, at least one soluble linear synthetic polyamide, at least one solvent and at least one assistant to a substrate and drying the applied magnetic layer at elevated temperature, provided that said dispersion contains as an assistant about 10 to 150% by weight, with reference to the soluble linear synthetic polyamide, of the condensation product of an aliphatic fatty acid having from 4 to 22 carbon atoms with a low molecular aliphatic hydroxyamine having at least one primary or secondary amino group and at least one hydroxy group and the applied magnetic layer is heated to a temperature above the softening temperature of the amorphous fraction of said polyamide.

According to this invention the prior art magnetic recording media obtained by applying a layer of a dispersion of the ferromagnetic powder and a soluble polyamide as binder and a solvent to a suitable backing and then drying this layer are improved by employing an aliphatic monocarboxylic acid and a hydroxyamine in the dispersion of the reaction product and by heating the resultant layer to a temperature above the softening point of the polyamide binder. This novel technique has a number of advantages which could not be foreseen.

Magnetic layers according to the present invention have the following advantages:

(1) In machine in which the magnetic tape is greatly stressed, e.g. equipment for recording television broadcasts and computer storage devices, the layer has improved wear properties;

(2) The flexibility of the tapes is better;

(3) The mechanical properties of the magnetic layer are substantially insensitive to fluctuations in temperature and humidity; and (4) The magnetic layer exhibits improved surface smoothness.

Surprisingly, the waterproofness of the magnetic layer is not decreased by adding a water-soluble reaction product of hydroxyamine provided the layer is dried at elevated temperature above the softening temperature of the amorphous fraction of the polyamide.

The condensation products of an aliphatic fatty acid with a low molecular weight aliphatic hydroxyamine which are used according to the invention are obtained by a conventional method wherein an aliphatic saturated or olefinically unsaturated fatty acid having 4 to 22, preferably 12 to 18, carbon atoms is reacted with an aliphatic hydroxyamine having at least one primary or secondary amino group and at least one aliphatic hydroxy group in the molecule. In general, the hydroxyamine should have a molecular weight of less than 500, preferably less than 250, and 2 to 18 carbon atoms. The condensation reaction is usually carried out in bulk or preferably in a conventional solvent at temperatures between 20 and 200° C., preferably 50 to 150° C. The preferred molar ratio of fatty acid to hydroxyamine is about 1:1 or about 1 mole of fatty acid per amino group in the hydroxyamine. Examples of fatty acids are butyric acid, caproic acid, caprylic acid, capric acid, lauric acid, tridecoic acid, palmitic acid, stearic acid, nondecylic acid, sorbic acid, linoleic acid, oleic acid, sperm oil fatty acid and linseed oil fatty acid. Examples of hydroxyamines are 3-hydroxypropylamine, 2-aminoethanol, N-methyl-2-aminoethanol, N-hydroxyethyl-2-aminoethanol, 2-aminobutanol, 2-amino-2-methyl-propanol, 3-amino-2-hydroxypropanol, diethanolamine monomethylether, N,N' - di - 2 - hydroxyethyl - ethylenediamine, N,N' - tetra - 2 - hydroxyethylethylenediamine, N,N'-di - 2 - hvdroxyethyl-propylenediamine.

Preferred are aliphatic hydroxyamines having 2 to 9, in particular 2 to 6, carbon atoms and hydroxyamines having 1 to 2 primary or secondary amino groups and 1 to 3 hydroxy groups containing no other hetero atoms than nitrogen and oxygen and containing no other reactive functional groups than said amino and hydroxy groups. Hydroxyalkylamines are particularly suitable. The condensation products of the fatty acid and the hydroxyamine should be soluble in conventional solvents and particularly in the solvent used for the linear polyamide. Those condensation products which are soluble in water and/or an alkanol having 1 to 4 carbon atoms are very suitable.

The polyamide component is conventional and can be readily selected by those skilled in this art. The expression "soluble linear synthetic polyamide" means a solid polyamide which is soluble in a conventional solvent or a mixture of organic solvents or a mixture of an organic solvent and water. These polyamides should have an intrinsic viscosity of at least 0.4 and are characterized by a plurality of recurring amido groups as an integral part of the linear chain of the molecule. Preparation of these polyamides is described for example in Houben-Weyl, Methoden der Organischen Chemie, 4th edition, Stuttgart 1963, volume 14/2 and in the literature cited therein. Preferred suitable linear polyamides are interpolyamides which are soluble in conventional solvents or mixtures of solvents, such as in lower aliphatic alcohols, e.g. methanol, ethanol, isopropanol, butanol, mixtures of alcohol and water, lower aliphatic ketones such as acetone or methyl ethyl ketone, aromatic hydrocarbons of the benzene series, such as benzene or toluene or mixtures of benzene, lower aliphatic alcohols and water. Suitable interpolyamides can be prepared by conventional methods by polycondensation or activated anionic polymerization of at least two lactams having seven to thirteen ring members. Examples of lactams are caprolactam, oenantholactam, capryllactam, laurolactam or corresponding C-substituted lactams, such as C-methyl-$\epsilon$-caprolactam, $\epsilon$-ethyl-$\epsilon$-caprolactam or $\delta$-ethyl-oenantholactam. The aminocarboxylic acids on which these lactams are based can be polycondensed instead of the lactams. Other suitable interpolyamides are the polycondensation products of salts of the diamine/dicarboxylic acid class which have been prepared from at least three polyamide-forming components. Examples of very suitable conventional dicarboxylic acids and diamines for the preparation of interpolyamides by polycondensation are aliphatic dicarboxylic acids having 6 to 18 carbon atoms, such as adipic acid, suberic acid, sebacic acid, dodecane dicarboxylic acid and equivalent substitution products, such as $\alpha,\alpha$-diethyladipic acid, $\alpha$-ethylsuberic acid, $\omega,\omega'$-octane dicarboxylic acid or $\omega,\omega'$-nonane dicarboxylic acid or mixtures of the same and also dicarboxylic acids having 6 to 18 carbon atoms and containing aliphatic or aromatic ring systems such as 1,3-cyclobutane dicarboxylic acid, 1,4-cyclohexane dicarboxylic acid, terephthalic acid or isophthalic acid; aliphatic diamines having 2 to 18 carbon atoms, such as pentamethylene diamine, hexamethylene diamine, heptamethylene diamine, octamethylene diamine or C-substituted and/or N-substituted derivatives of these amines, such as N-methylhexamethylene diamine, N-ethylhexamethylene diamine, 1,6-diamino-3-methylhexane, cycloaliphatic and aromatic diamines having 4 to 18 carbon atoms, such as 1,4-cyclohexylene diamine, m-phenylene diamine, m-xylylene diamine, and 4,4'-diaminodiphenylmethane. Corresponding dicarboxylic acids and diamines in which the carbon-carbon chain between the two carboxylic acid groups or amino groups is interrupted by heteroatoms, particularly —O— and/or —NR— groups, wherein R denotes hydrogen or lower alkyl, are also suitable.

Particularly suitable interpolyamides are those which have been prepared by co-condensation of a mixture of one or more of said lactams and at least one salt of a dicarboxylic acid and diamine, for example by polycondensation of a mixture of $\epsilon$-caprolactam, hexamethylene diammonium adipate and p,p'-diaminodicyclohexylmethane adipate. Linear synthetic polyamides prepared by polymerization or polycondensation of one of the lactams or salts of one dicarboxylic acid and one diamine mentioned above are also suitable for the compositions, provided they are soluble in a conventional solvent. They contain preferably more than 5 carbon atoms per amido group in the polymer chain. Examples are described in Houben-Weyl, loc. cit. and the literature cited therein.

Very suitable solvents for the linear synthetic polyamides, which are used for the dispersions to be applied to a suitable backing according to this invention, are alkanols having 1 to 4 carbon atoms and mixtures of alkanols, such as methanol, ethanol, propanol, aliphatic chlorohydrocarbons having 1 to 6 carbon atoms, such as methylene chloride, chloroform or ethylene chloride, and mixtures of one or more of these solvents with water. However, the other solvents for the linear synthetic polyamide being used and mentioned above are also suitable.

The preparation of the dispersion of the ferromagnetic particulate substance in a solution of the linear synthetic polyamide as a binder is known in the art and is accomplished by conventional methods. Generally the solution of the polyamide in a suitable solvent or solvent mixture is prepared first and added to a mixture of the ferromagnetic substances, the condensation products of fatty acids and hydroxyamines, the solvent and, if desired, other assistants and additives, such as dispersing agents. The components are uniformly dispersed in conventional mixing equipment, for example in a stirred ball mill, ball mill or pebble mill.

Plasticizers for polyamides, such as benzenesulfonic butylamide, phthalic anhydride, maleic anhydride, 2-ethylhexyl-p-hydroxybenzoate, may also be used, for example in an amount of 0.5 to 5% by weight of the polyamide, and are preferably added to the solution of the synthetic polyamide used. The condensation products of the fatty acids and hydroxyamines are preferably employed in an amount of 10 to 150%, in particular 10 to 60% by weight with reference to the synthetic polyamide.

The ratio by weight of the ferromagnetic substance to the binder may vary within wide limits, for example from 2:1 to 6:1, preferably from 3:1 to 5:1.

Examples of suitable ferromagnetic substances are magnetite, acicular iron oxide ($\gamma$-$Fe_2O_3$) or metallic substances, such as iron powder having suitable magnetic values. These magnetic particles or powders are well known in the art.

It may be advantageous to add small amounts, e.g. 0.1 to 2% by weight of the polyamide of dispersing agents, such as aliphatic fatty alcohols or fatty acids having 12 to 22 carbon atoms; ethenoxylation products of these compounds or of fatty amines or phenols, preferably alkyl phenols having 4 to 12 carbon atoms in the alkyl radical, such ethenoxylation products containing 1 to 50 ethoxy groups in the surface active molecules. Silicones are also suitable as dispersing agents.

Suitable backings, such as sheets, tapes or films, for the magnetizable layer are known in the art. Examples of these are prepared from thermoplastic polymers, such as linear polyesters, e.g. polyethylene terephthalate, polyvinyl chloride, cellulose triacetate or polyacrylonitrile.

Production of the magnetic tapes can be carried out by applying the liquid magnetic dispersion to the sheets or cylinders, which are for example made of plastics or paper, by conventional methods, for example by pouring or casting. The applied layers are dried with air at elevated temperature. It has proved to be particularly advantageous to carry out drying at 95° to 110° C. Conventional tunnel dryers can be used for drying, the coated webs being passed therethrough over rollers. Instead of drying in the above-mentioned manner the magnetic layers prepared according to this invention can be dried in one or more stages at lower temperature, for example at 50° C., and then heated to temperatures above the softening temperature of the amorphous fraction of the polyamide. This softening temperature, in general, is above 50° C. and often between 50 and 90° C., so that the magnetic layer is advantageously dried at from 50° to 105° C., particularly from 90° to 105° C.

Usually the magnetic layer is heated to a temperature which is about 3 to 50° C. above the softening temperature of the amorphous fraction of the polyamide binder used. The heating time depends on the chosen temperature. At any rate the heating period should be long enough to evaporate all solvents and to soften the polyamide binder in the magnetic layer. Heating periods of about 30 seconds to about 1 hour are normally sufficient, higher temperatures resulting in shorter periods of heating and lower temperatures in longer periods.

The layers are applied in the usual thickness, preferably in a thickness of 2 to 20 microns with reference to the dried layer of the final product.

Magnetic recording media having particularly advantageous properties are obtained when the dried magnetic layer contains 400 to 650 parts of ferromagnetic substance and 10 to 150 parts of the condensation product of fatty acids and hydroxyamines used according to the invention to 100 parts of soluble polyamide.

Magnetic recording media prepared according to the invention are particularly suitable for video tape recording, for computer tapes or for highly stressed instrumentation tapes.

This invention is illustrated by the following example in which parts and percentages are by weight.

EXAMPLE 500 parts of gamma-iron (III) oxide are milled in an iron six-liter ball mill for 48 hours with 50 parts of a condensation product of 1 mole of oleic acid and 1 mole of 2-aminoethanol, condensed in conventional manner at a temperature at from 60 to 120° C., 750 parts of a solvent mixture of 70% of methanol, 20% of benzene, 10% of water and 4 parts of six-millimeter steel balls. Then 500 parts of a solution of 100 parts of a linear polyamide prepared from 35% of hexamethylene diamine adipate, 30% of caprolactam and 35% of diaminodicyclohexylmethane adipate in 400 parts of the above solvent mixture is added and the whole is milled for another twenty-four hours.

After having been filtered through a 30 micron paper filter, the magnetic dispersion is cast to a dry layer thickness of 8 microns on a polyethylene terephthalate film and dried in a through-circulation dryer (residence time about 100 seconds) at 105° C. The softening temperature of the amorphous fraction of the synthetic polyamide used is about 70° C. The coated side is then drawn over a polished metal roller at about 90° C.

The product is cut into tapes two inches wide which will withstand 2000 passes through a four-head studio video recording machine without losing their usefulness. When the tapes are immersed in water for ten minutes, they have a life in stop motion of about two hours on a helical scan recorder. A magnetic tape produced essentially in the same way but without employment of the condensation product of oleic acid and 2-aminoethanol exhibits clearly inferior test results.

We claim:

1. In a method of producing a magnetic recording media by applying to a backing a layer of a dispersion consisting essentially of a ferromagnetic powder, a solvent-soluble linear synthetic polyamide binder having an amorphous fraction and an intrinsic viscosity of at least 0.4, a solvent for said polyamide and at least one assistant and then drying the applied layer, the improvement which comprises applying a layer of said dispersion which contains as an assistant from 10 to 150% by weight, with reference to said synthetic polyamide, of a soluble condensation product of an aliphatic fatty acid having 4 to 22 carbon atoms and an aliphatic hydroxyamine having at least one primary or secondary amino group, at least one hydroxy group and a molecular weight of less than 500 and heating the applied magnetic layer to a temperature higher than the softening temperature of the amorphous fraction of said synthetic polyamide.

2. A method as claimed in claim 1, wherein the dispersion contains about 400 to 650 parts by weight of the ferromagnetic powder per 100 parts by weight of said linear synthetic polyamide.

3. A method as claimed in claim 2, wherein the ferromagnetic powder is gamma-iron (III) oxide.

4. A method as claimed in claim 1, wherein the aliphatic hydroxy amine is 2-aminoethanol.

5. A method as claimed in claim 1, wherein the soluble condensation product is the condensation product of 1 mole of oleic acid with 1 mole of 2-aminoethanol.

6. A method as claimed in claim 1, wherein the soluble condensation product is the condensation product of 1 mole of stearic acid with 1 mole of 2-aminoethanol.

7. A method as claimed in claim 1, wherein the applied magnetic layer is heated to a temperature of from 90 to 105° C.

8. Magnetic recording media produced according to the method claimed in claim 1.

References Cited

UNITED STATES PATENTS

| | | | |
|---|---|---|---|
| 3,185,589 | 5/1965 | Damm | 252—62.54 X |
| 3,262,812 | 7/1966 | Falk | 117—237 |
| 3,290,252 | 12/1966 | Larsen et al. | 252—65.54 |
| 3,387,993 | 6/1968 | Flowers. | |
| 3,387,995 | 6/1968 | Senkpiel et al. | 117—121 X |

WILLIAM D. MARLIN, Primary Examiner

B. D. PIANALLO, Assistant Examiner

U.S. Cl. X.R.

117—161, 240; 252—62.54